(12) United States Patent
Klink et al.

(10) Patent No.: US 10,008,061 B2
(45) Date of Patent: Jun. 26, 2018

(54) SECURE ACCESS TO PHYSICAL RESOURCES USING ASYMMETRIC CRYPTOGRAPHY

(71) Applicant: LOCKEDUP LTD., Kitchener (CA)

(72) Inventors: Jerod Klink, Kitchener (CA); Herb Little, Waterloo (CA)

(73) Assignee: Sera4 Ltd., Waterloo (CA)

( * ) Notice: Subject to any disclaimer, the term of this patent is extended or adjusted under 35 U.S.C. 154(b) by 0 days. days.

(21) Appl. No.: 15/332,057

(22) Filed: Oct. 24, 2016

(65) Prior Publication Data

US 2018/0114387 A1    Apr. 26, 2018

(51) Int. Cl.
| | |
|---|---|
| *G07C 9/00* | (2006.01) |
| *H04L 9/32* | (2006.01) |
| *H04W 12/04* | (2009.01) |
| *H04W 12/08* | (2009.01) |
| *H04W 12/02* | (2009.01) |
| *H04W 12/06* | (2009.01) |

(52) U.S. Cl.
CPC ........ *G07C 9/00309* (2013.01); *H04L 9/3263* (2013.01); *H04W 12/02* (2013.01); *H04W 12/04* (2013.01); *H04W 12/06* (2013.01); *H04W 12/08* (2013.01); *G07C 2009/00412* (2013.01); *G07C 2009/00793* (2013.01)

(58) Field of Classification Search
None
See application file for complete search history.

(56) References Cited

U.S. PATENT DOCUMENTS

| | | | |
|---|---|---|---|
| 4,837,822 A | 6/1989 | Crosley et al. | |
| 4,936,122 A | 6/1990 | Osada | |
| 5,420,568 A | 5/1995 | Iida et al. | |
| 6,698,263 B2 | 3/2004 | Hsieh | |
| 7,260,835 B2 | 8/2007 | Bajikar | |
| 7,334,443 B2 | 2/2008 | Meekma et al. | |
| 8,141,400 B2 | 3/2012 | Sorensen et al. | |
| 8,490,444 B2 | 7/2013 | Saari et al. | |
| 8,593,249 B2 | 11/2013 | Bliding et al. | |
| 8,674,832 B1 | 3/2014 | Thomas | |
| 2004/0257209 A1 | 12/2004 | Yang | |
| 2009/0183541 A1* | 7/2009 | Sadighi | G07C 9/00103 70/263 |
| 2012/0096909 A1* | 4/2012 | Hart | G08C 17/02 70/278.1 |
| 2013/0176107 A1 | 7/2013 | Dumas et al. | |

* cited by examiner

*Primary Examiner* — Leon-Viet Nguyen
(74) *Attorney, Agent, or Firm* — Perry + Currier Inc.

(57) ABSTRACT

Digital certificates are signed by a server's private key and installed at lock controllers that restrict access to physical resources. The server's public key is distributed to lock controllers and to mobile electronic devices operated by users who are given access to the physical resources. Lock-access data is digitally signed by the server's private key and provided to mobile electronic devices to facilitate access. The lock controller validates lock-access data and grants access conditionally based on time, version, and/or identity data provided within lock-access data. The use of certificates reduces the need to rely on a security scheme specific to the network. Lock controllers can also broadcast status notifications, so that updates and log data can be securely communicated with the server using mobile electronic devices as a proxy. The system is highly scalable, as each lock controller need not track the full scope of access permissions.

13 Claims, 10 Drawing Sheets

SECURE ACCESS TO PHYSICAL RESOURCES USING ASYMMETRIC CRYPTOGRAPHY

FIELD

This invention relates to security, more specifically, to secure access to physical resources.

BACKGROUND

Known techniques for securing physical resources, such as buildings, include providing an electronic lock to a door and then configuring the lock to respond to the presence of an access card, key code, or similar. More recent systems use smartphones to open electronic locks. In such systems, the electronic lock tends to be wired for power or have easily replaceable batteries. In addition, reliable control signalling to the electronic lock is often a requirement.

Conventional systems are ill-suited for securing physical resources that are not readily wired for power and data. Such resources are often at remote locations or are infrequently accessed. Running data and/or power to such resources can be prohibitively expensive and complicated. As such, these kinds of resources are often secured using physical keys, which can be easily copied, lost, or stolen.

Moreover, many conventional systems, such as those that are used in residential applications, often take for granted the physical exposure of the lock to augment the relatively simple security technology provided. That is, it is often thought that a typical residential "smart lock" need only be as secure as the deadbolt that it replaced, as someone trying to gain unauthorized access to a residential smart lock is a comparable threat to someone trying to pick a deadbolt. This may suffice for residential applications. However, for remote or infrequently accessed physical resources, those trying to gain unauthorized access have much more time and ability to do so without timely detection. Hence, conventional systems, particularly those that can be categorized as residential smart locks, are incapable of adequately protecting such resources.

SUMMARY

According to various aspects of the present invention, a server stores a public and private key pair. Digital certificates are signed by the server's private key and installed at electronic lock controllers that restrict access to physical resources. The server's public key is distributed to the lock controllers and to mobile electronic devices operated by users who are to be given access the physical resources. When a mobile electronic device enters the vicinity of a lock controller, the digital certificate of the lock controller is used as the basis for encrypted communications between the mobile electronic device and the lock controller. Lock-access data that has been digitally signed by the server's private key is transmitted to the mobile electronic device to provide to the lock controller to gain access to the physical resource. The lock controller validates the lock-access data and grants access conditionally based on time, version, and/or identity data provided within the lock-access data.

BRIEF DESCRIPTION OF THE DRAWINGS

The drawings illustrate, by way of example only, embodiments of the present invention.

DETAILED DESCRIPTION

The present invention aims to solve at least one of the problems discussed above. Specifically, the present invention assigns unique cryptographic keys to different electronic locks, so that encrypted and authenticated channels can be established with mobile devices of users trying to gain access to physical resources protected by the electronic locks. Digital signatures are used to help mobile devices avoid communicating with imposter locks and to prevent mobile devices from using forged access data to open electronic locks. Further aspects and advantages of the present invention will be apparent from the below detailed description.

Figure 1:
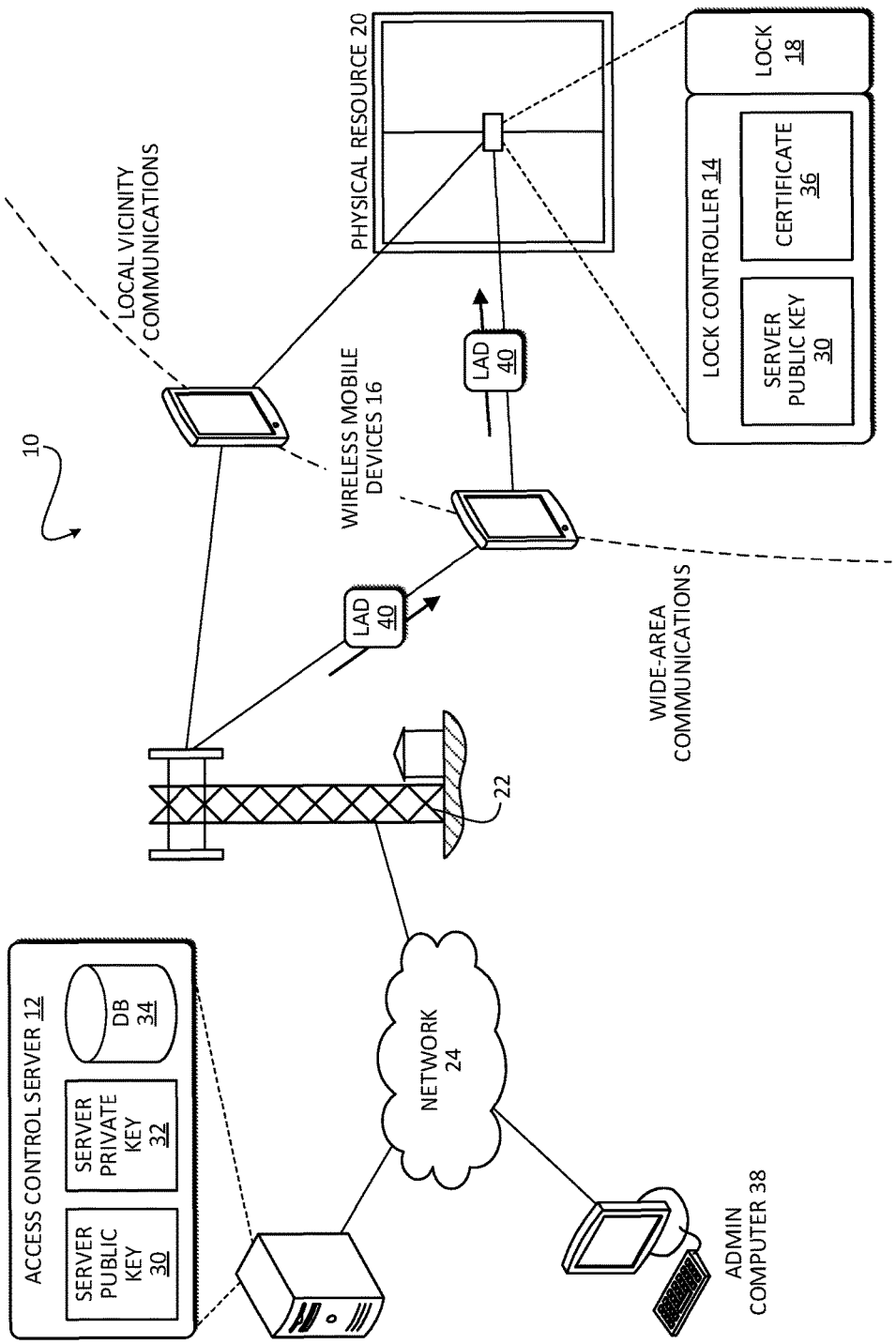
FIG. 1 is a diagram of a system for providing secure access to a physical resource.

FIG. 1 depicts a system 10 for providing secure access to a physical resource according to the present invention. The system 10 includes an access control server 12, an electronic lock controller 14, and a plurality of wireless mobile devices 16. The lock controller 14 unlocks a physical lock 18 that restricts access to a physical resource 20. Unlocking is based on access requests made by the wireless mobile devices 16, as controlled by access permissions managed by the access control server 12. The system 10 can include any number of access control servers 12, electronic lock controllers 14, and wireless mobile devices 16 to restrict access to any number of physical resources 20. The present invention includes asymmetric cryptographic techniques that allow for flexible, secure, and readily configurable control of access to the physical resource 20.

The physical resources 20 guarded by the present invention may be situated at remote geographic locations. Examples of such resources include cell tower shacks, oilfield installations, construction equipment and sites, remote industrial facilities, an similar. The physical resources 20 guarded by the present invention may include industrial or commercial fixtures, such as storage cabinets, lockers, storerooms, yards, and similar. The present invention is particularly suited for physical resources that are normally accessed from one side (e.g., a shack that is not normally occupied, a cabinet, etc.). In addition, the present invention is particularly suited for physical resources that are located remote from grid power and wired computer networks or that are not particularly suited for connection to grid power and wired computer networks. A salient example of a physical resource 20 is a cell tower shack that contains valuable equipment such as network devices and high-capacity batteries. That said, the preceding are merely examples of the types of physical resources 20 suitable for use with the present invention and they should not be taken as unduly limiting.

The wireless mobile devices 16 are configured to connect to the access control server 12 via a computer network 24. The computer network 24 includes one or more internet protocol (IP) networks, such as an intranet, a local-area network, a wide-area network, a virtual private network (VPN), a Wi-Fi network, the internet, and similar. Any suitable protocol, such as TLS and HTTPS, can be used for secure data communications. The computer network 24 can include cellular/mobile network infrastructure 22 that operates according to any type of cellular/mobile network technology and standard (e.g., 2G, 3G, 4G, GSM, UMTS/UTRA, HSPA, LTE, CDMA, WiMAX, etc.) that provides for relatively long-range wireless communications. Generally, the computer network 24 uses grid power and has wired components (e.g., Ethernet, fiber optics, etc.).

The access control server 12 stores a public key 30 and a corresponding private key 32. The keys 30, 32 may be generated according to any asymmetric cryptographic scheme or equivalent cryptographic scheme. For example, NIST-approved elliptical curve cryptography can be used. The access control server 12 further stores a database 34 that stores a plurality of user accounts for users of the wireless mobile devices 16 to be provided with secure access to the physical resource 20. One or more administrator computers 38 can be provided to manage the access control server 12, and particularly manage the user accounts and which users have access to which physical resources at what times.

The lock controller 14 stores a digital certificate 36 that includes a public key and a corresponding private key for the particular lock 18. Each lock controller 14 has its own unique digital certificate 36. The public and private keys of the lock controller 14 also accord to the selected asymmetric cryptographic scheme. Keys of any suitable bit length (e.g., 64-bit, 128-bit, 256-bit, etc.) can be employed based on the desired level of security. In addition, the digital certificate 36 has been previously digitally signed by the private key 32 of the server 12. Signing of the digital certificate 36 with the private key 32 of the server 12 is preferably done in a secure environment, such as at a factory that manufactures lock controllers and provisions access control servers. The lock controller 14 further stores the public key 30 of the access control server 12.

The wireless mobile devices 16 are carried by users who are to be granted access to the physical resource 20. Access permissions are associated with user accounts in the database 34. A user logs into his/her account, using for example a unique username and password, from their wireless mobile device 16 to obtain from the server 12 lock-access data 40 that grants access to the physical resource 20 or grants another permission with respect to the lock controller 14.

In this embodiment, the wireless mobile device 16 and electronic lock controller 14 are configured to mutually connect for data communications when within local vicinity of each other. That is, each of the wireless mobile devices 16 and the electronic lock controller 14 has a local-range communications interface, which can include a chipset and/or antenna/transceiver operable according to any suitable short-range wireless communications scheme (e.g., Bluetooth, Bluetooth Smart, Bluetooth Low Energy or BLE, Wi-Fi, ZigBee, Google Thread, Near Field Communication or NFC, etc.), short-range audio communications scheme, short-range infrared communications scheme, or similar technology. The particular short-range communications scheme selected is not specifically limited, though its range is shorter than that provided by the computer network 24. However, because the present invention concerns granting physical access to remote physical resources that may not have access to grid power, it is contemplated that shorter-ranged schemes will generally be more advantageous due to reduced power consumption. The presently preferred short-range communications schemes include Bluetooth and BLE.

In other embodiments, the wireless mobile device 16 and electronic lock controller 14 are configured to mutually connect for data communications over the computer network 24 (e.g., over the internet).

Concerning operation of the system, in overview, the server 12 digitally signs lock-access data 40 specific to the user and the lock controller 14 using its private key 32 prior to transmitting the lock-access data 40 to a wireless mobile device 16 of a user who wishes to gain access to the physical resource 20. The wireless mobile device 16 obtains the lock controller's server-signed digital certificate 36 from the lock controller 14, when in vicinity of the lock controller 14, and validates the authenticity of the certificate 36, and thus the authenticity of the lock controller 14 itself, using the server's public key 30. Once validated, communications between the wireless mobile device 16 and the lock controller 14 can be secured on the basis of the lock controller's digital certificate 36. The wireless mobile device 16 can safely encrypt the lock-access data 40 using the lock controller's public key and transmit the encrypted lock-access data 40 to the electronic lock controller 14, which can use its private key to decrypt the lock-access data 40. The lock controller 14 can validate the authenticity of the lock-access data 40 using the server's public key 30. If the lock-access data 40 is successfully validated, the lock controller 14 performs one or more operations defined by the lock-access data 40, such as unlocking the lock 18. Similar processes can be used to allow the server 12 to update settings of the lock controller 14, to communicate data (e.g., log data) from the lock controller 14 to the server 12, and to confirm that the lock 18 has been properly locked after access to the resource 20 is completed. The above process can also be used to lock the lock 18, although it is contemplated that unlocking the lock 18 will generally be more of a security concern.

It is advantageous that the wireless mobile device 16 and the lock controller 14 communicate using a digital certificate assigned to the lock controller 14. The server 12 signs both the lock-access data 40 and the lock controller's digital certificate 36, advantageously allowing the lock controller 14 and the wireless mobile device 16, respectively, to validate the authenticity of the lock-access data 40 and the lock controller's digital certificate 36. This allows the lock controller 14 to detect forged lock-access data and respond appropriately by, for example, not opening the lock 18, logging an unauthorized access attempt, issuing an alarm, or similar. In addition, the wireless mobile device 16 can detect an impostor lock controller and respond appropriately by, for example, not transmitting the lock access data, notifying the server 12 of the location of the unauthorized lock controller, and similar. The present invention will be discussed in further detail below and additional aspects and advantages will become apparent.

Figure 2:
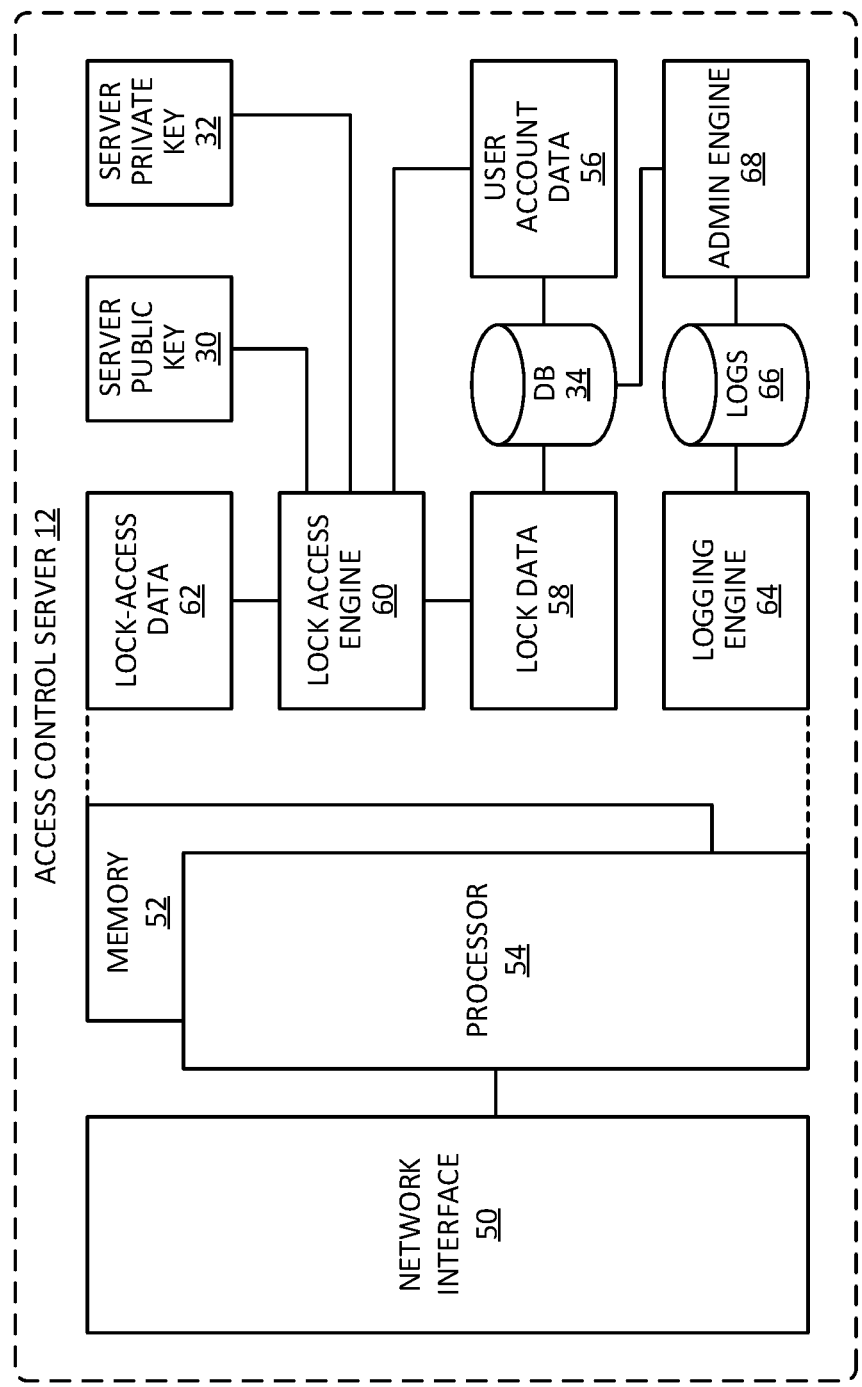
FIG. 2 is a diagram of an access control server.

FIG. 2 shows a block diagram of the access control server 12. The server 12 is one example of a server that can be used with the system 10. The term server as used herein refers to a single server or multiple cooperating servers.

The server 12 includes a network interface 50, memory 52, and a processor 54. The network interface 50 is configured for bidirectional data communications through the computer network 24. The network interface 50 includes a network adaptor and driver suitable for the type of network 24. The memory 52 includes any combination of read-only memory (ROM), random-access memory (RAM), flash memory, magnetic storage, optical storage, and similar for storing instructions and data as discussed herein. The processor 54 includes one or more central-processing units (CPU), microcontrollers, microprocessors, processing cores, field-programmable gate arrays (FPGA), and similar. All or some of the memory 52 may be integrated with the processor 54. The processor 54 and memory 52 cooperate to execute instructions to cause the server 12 to perform the functionality discussed herein.

As mentioned above, the server 12 stores the server's public and private keys 30, 32 in addition to the database 34. The database 34 stores users account data 56 and lock data 58.

The server 12 further includes a lock-access engine 60 that is configured to generate lock-access data 62 based on the lock data 58 and the user account data 56 to allow access to specific physical resources by specific users at specific times. The lock-access engine 60 is further configured to digitally sign lock-access data 62 using the server's private key 32. Lock-access data 40 discussed above is an example of lock-access data 62. The lock-access engine 60 is configured to manage log ins by users and transmit appropriate lock-access data 62 via the network interface 50 to respective wireless mobile devices 16. In addition, the lock-access engine 60 can be configured to deploy the server's public key 30 to the wireless mobile devices 16.

The server 12 maintains the lock-access data 62 in association with the plurality of user accounts stored as user account data 56. The lock-access engine 60 is configured to transmit lock-access data 62 to a particular wireless mobile device 16 upon the wireless mobile device 16 establishing a connection to the server 12 via the network interface 50 and the user of the wireless mobile device 16 successfully logging into their account.

The lock-access engine 60 is configured to handle continued access to physical resources while at the same time allowing for access permissions to be revoked. This can be achieved in several ways. In one example, the lock-access engine 60 periodically regenerates the lock-access data 62 with updated permitted access schedules, where such regeneration can be ceased for specific users in order to deny access to the physical resource to such users. Users log into the server 12 to obtain fresh lock-access data 62 for the period. A user who is denied access to a resource will not receive fresh lock-access data 62 for the period and instead will bear expired lock-access data. The risk of unauthorized access is thus inversely proportional to the frequency of regeneration. That is, if lock-access data 62 for each user is regenerated each night to grant access for the following day, then a user whose permission is revoked for a particular resource will still have access for, at most, one day following the revocation. To complement this technique, particularly when a short period of regeneration is selected, the database can further store a regeneration end time for each user, after which lock-access data 62 will no longer be regenerated. This can allow for fresh lock-access data 62 to be generated periodically (e.g., daily, weekly, etc.) within a larger period (e.g., one month), and may be useful in that the administrator does not have to return to the server 12 to actively revoke a permission. In an example use case, a regeneration end time for employees is set to one year and a regeneration end time for contractors is set to the time in the future that the contract is expected to end.

In another example of revoking permissions, the lock data 58 includes version data that is provided to the lock controllers 14. The lock-access engine 60 updates the version data when access permission to any user or users is revoked. Users who are not revoked obtain lock-access data 62 containing the updated version data, which matches that sent by the lock controllers 14, thereby permitting access. Users whose permissions are revoked can only present lock-access data that includes non-updated version data, and the lock controllers 14 are configured to ignore and/or log access requests bearing non-matching version data.

The above two techniques for revoking permissions can be used independently or combined.

The server 12 further includes a logging engine 64 configured to receive log data from deployed lock controllers 14 and to save long-term lock access logs 66.

The server 12 further includes an admin engine 68 configured to receive updates to user account data 56 and lock data 58. The admin engine 68 is configured to create, modify, and delete user accounts, as well as logically create, modify, and delete lock controllers 14. Further, the admin engine 68 is configured to set access permissions by creating lock-access data 62 for various combinations of users and lock controllers and to revoke access permissions, as needed, by updating version data and/or setting regeneration expiry times.

Figure 3:
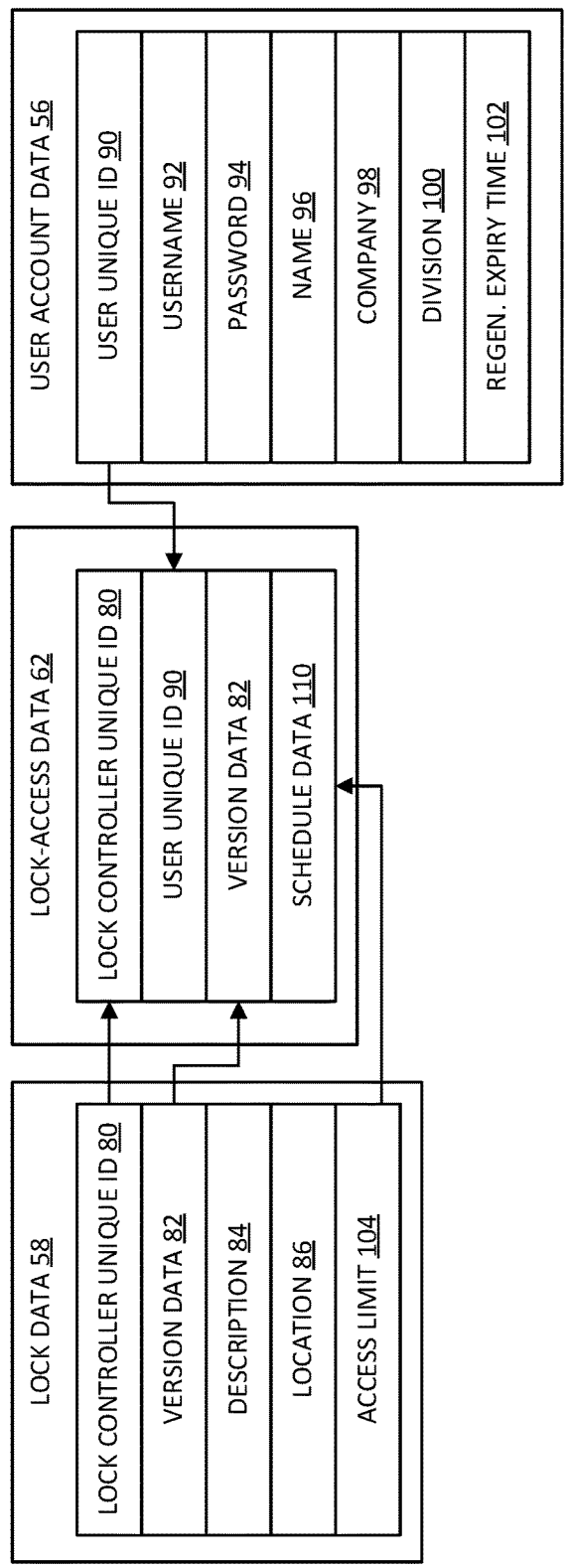
FIG. 3 is a diagram of data structures for users and lock controllers.

FIG. 3 shows data structures for lock data 58, lock-access data 62, and user account data 56.

An element of lock data 58 is mapped to a lock controller 14 by way of a lock controller unique identifier 80, which can be a serial number, an alphanumeric code, a hash, or similar kind of unique or pseudo-unique identifier. Lock data 58 further includes version data 82, which is a number, alphanumeric code, or similar data element representative of the current version of access for the lock controller 14. Version data 82 can be changed to revoke access to a particular user by informing all other users of the new version, but not informing the particular user. Lock data 58 can further include a text description of the lock controller 14 or the respective resource 20 and a location 86 (e.g., geographic coordinates) of the lock controller 14. The lock data 58 may also store an access limit 104 for each lock controller to specify the maximum access time that will provided in schedule data, so as to force users to obtain fresh lock-access data more frequently for highly secure resources. That is, the access limit 104 defines the maximum validity period for a particular element of lock-access data 62 (e.g., 24 hours for highly secure locations, one month for lower security locations, etc.). This ensures that users have their credentials authenticated at frequency commensurate with the security required for the particular resource.

An element of user account data 56 is mapped to a user by way of a user unique identifier 90, which can be a number, an alphanumeric code, a hash, or similar kind of unique or pseudo-unique identifier. The user unique identifier 90 can correspond to the user or the wireless mobile device 16 assigned to the user. Examples of user unique identifiers 90 include an email address, an employee number, a username, a hash of the user's name and birthdate, a hash of the username and/or password, a phone number, a phone IMEI, a MAC address, and similar. User account data 56 further stores a username 92 and password 94 for each user to authenticate with the server 12, and may store additional information about the user, such as name 96, company 98, division 100, and similar. When access-data regeneration is used, the user account data 56 may also store a regeneration expiry time 102 for each user, so that permission may be globally granted/revoked for each user.

The lock-access data 62 defines access permissions to a physical resource 20 for a user of a wireless mobile device 16. Accordingly, each element of lock-access data 62 includes a lock controller unique identifier 80 of the specific lock controller 14/physical resource 20 for which access is being granted, version data (if used) for the specific a lock controller 14, access schedule data 110 that includes at least one start time and at least one end time, and may further include a user unique identifier 90 for the specific user or device being granted access. The schedule data 110 can include a date and/or time of day defining the beginning and ending of a period of permitted access for a particular user. When the lock-access data 62 is provided by the wireless mobile device 16 to the lock controller 14, the lock controller 14 checks that the received lock-access data 62 matches comparable data stored at the lock controller 14 before opening the lock. That is, the lock controller 14 only opens the lock 18 after the identity and time conditions are met.

Figure 4:
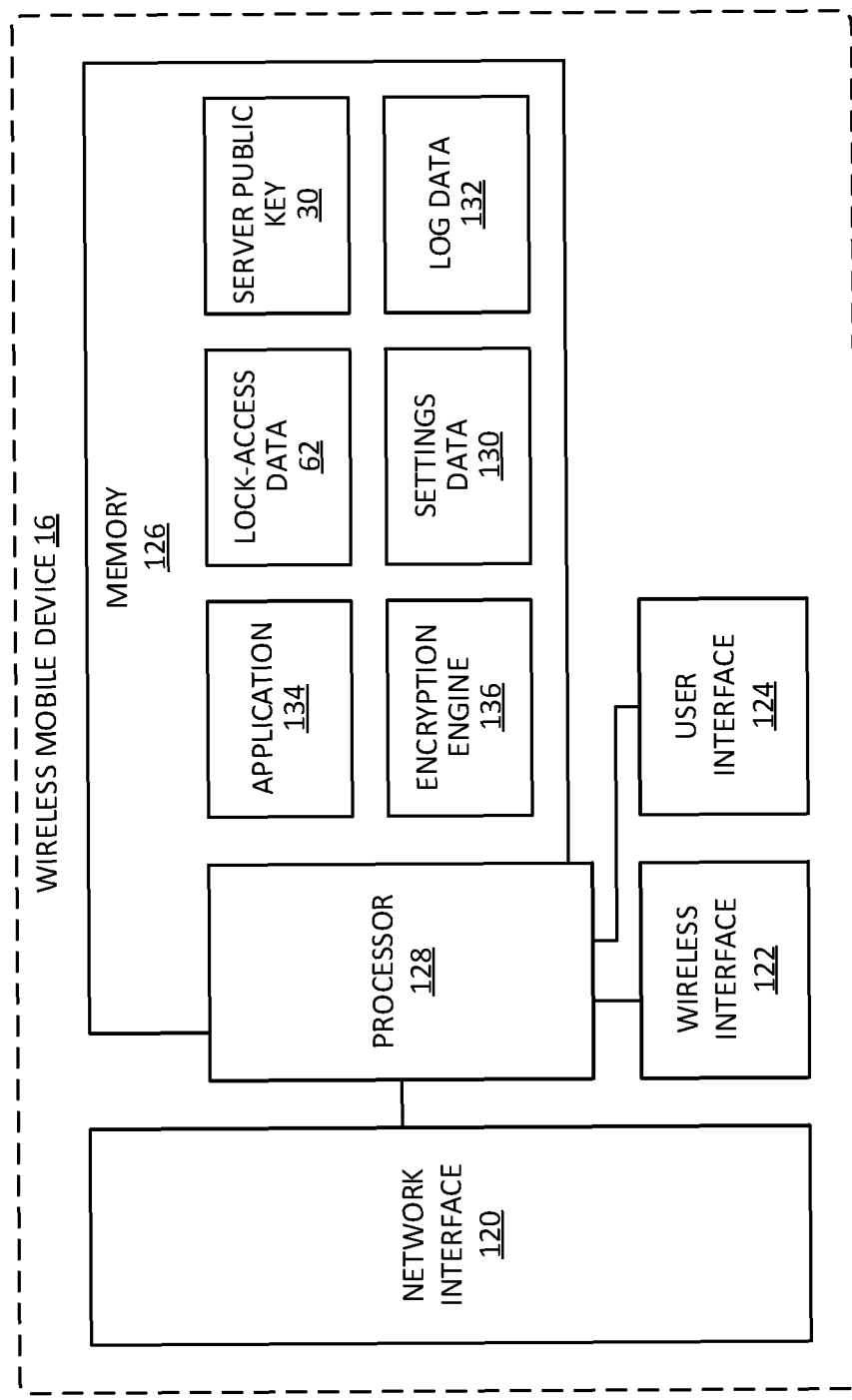
FIG. 4 is a diagram of a wireless mobile device.

FIG. 4 shows a block diagram of a wireless mobile device 16. The wireless mobile device 16 is one example of a wireless mobile device that can be used with the system 10.

The wireless mobile device 16 includes a network interface 120, a wireless interface 122, a user interface 124, memory 126, and a processor 128. The network interface 120 is configured for bidirectional data communications via the computer network 24. The network interface 120 includes a network adaptor and driver suitable for the type of network 24. The wireless interface 122 includes a short-range communications interface, such those discussed above (e.g., Bluetooth, BLE, etc.). The network interface 120 and the wireless interface 122 may be the same interface configured differently. The user interface 124 includes a display device, a touchscreen, a keyboard, a microphone, a speaker, or a combination of such. The memory 126 includes any combination of ROM, RAM, flash memory, magnetic storage, optical storage, and similar for storing instructions and data as discussed herein. The processor 128 includes one or more CPUs, microcontrollers, microprocessors, processing cores, field-programmable gate arrays FPGAs, and similar. All or some of the memory 126 may be integrated with the processor 128. The processor 128 and memory 126 cooperate to execute instructions to cause the wireless mobile device 16 to perform the functionality discussed herein.

The wireless mobile device 16 is configured to store the server public key 30 and further store any lock-access data 62 to be used to gain access to physical resources 20. The wireless mobile device 16 can further be configured to temporarily store settings data 130 in transit from the server 12 to a particular lock controller 14 and log data 132 in transit from a particular lock controller 14 to the server 12. The wireless mobile device 16 is configured to act as a data proxy between the server 12 and the lock controller 14. Hence, the wireless mobile device 16 may be required to temporarily store settings data 130 and/or log data 132 at times when long-range data communications are not available through the network interface 120. For example, a physical resource 20 may be located outside of cellular coverage and the wireless mobile device 16 holds log data destined for the server 12 until the wireless mobile device 16 returns to coverage. Likewise, the settings data destined to the lock controller 14 may be transmitted to the wireless mobile device 16 before the wireless mobile device 16 leaves coverage.

The wireless mobile device 16 further includes an application 134 and an encryption engine 136. The application 134 can be configured to provide human-intelligible descriptions for any stored lock-access data 62, such as resource description and location, or to hide lock-access data 62 from the user. Similarly, the application 134 can be configured to provide human-intelligible descriptions for any stored server public keys 30, such as owner name, or to hide server public keys 30 from the user. The application 134 is configured to manage connections and account credentials with the server 12 and to receive lock access data 62 from the server 12. The application 134 is further configured to interface with the encryption engine 136.

The application 134 can be further configured to accept status notifications from lock controllers 14 in vicinity of the wireless mobile device 16 and to respond by retrieving data (e.g., log data) from a lock controller 14 and transporting such data to the server 12 or by obtaining data (e.g., version data or other settings data 130) from the server 12 and transporting such data to the lock controller 14. The application 134 can be configured to facilitate such transport of data irrespective of whether a particular lock controller 14 is to be accessed by the wireless mobile device 16. That is, a wireless mobile device 16 can act as a wireless data proxy between electronic lock controllers 14 and the server 12. Transporting these kinds of data can be hidden from the user, as no user interaction is required. The application 134 can further be configured to use the encryption engine 136 to encrypt data bound a lock controller 14 using that lock controller's public key.

The encryption engine 136 is configured to use the server's public key 30 to validate the authenticity of any certificate provided by electronic lock controllers 14, and to encrypt lock-access data 62 received from the server 12 using validated public keys of the lock controllers 14. The application 134 is configured to transmit any messages containing encrypted lock-access data 62 to the respective electronic lock controllers 14 via the wireless interface 122.

The application 134 can further be configured to handle discovery/pairing with electronic lock controllers 14, as well as setup and expiry of short-range communications sessions with electronic lock controllers 14, according to the particular communications scheme used (e.g., Bluetooth, BLE, etc.)

Figure 5:
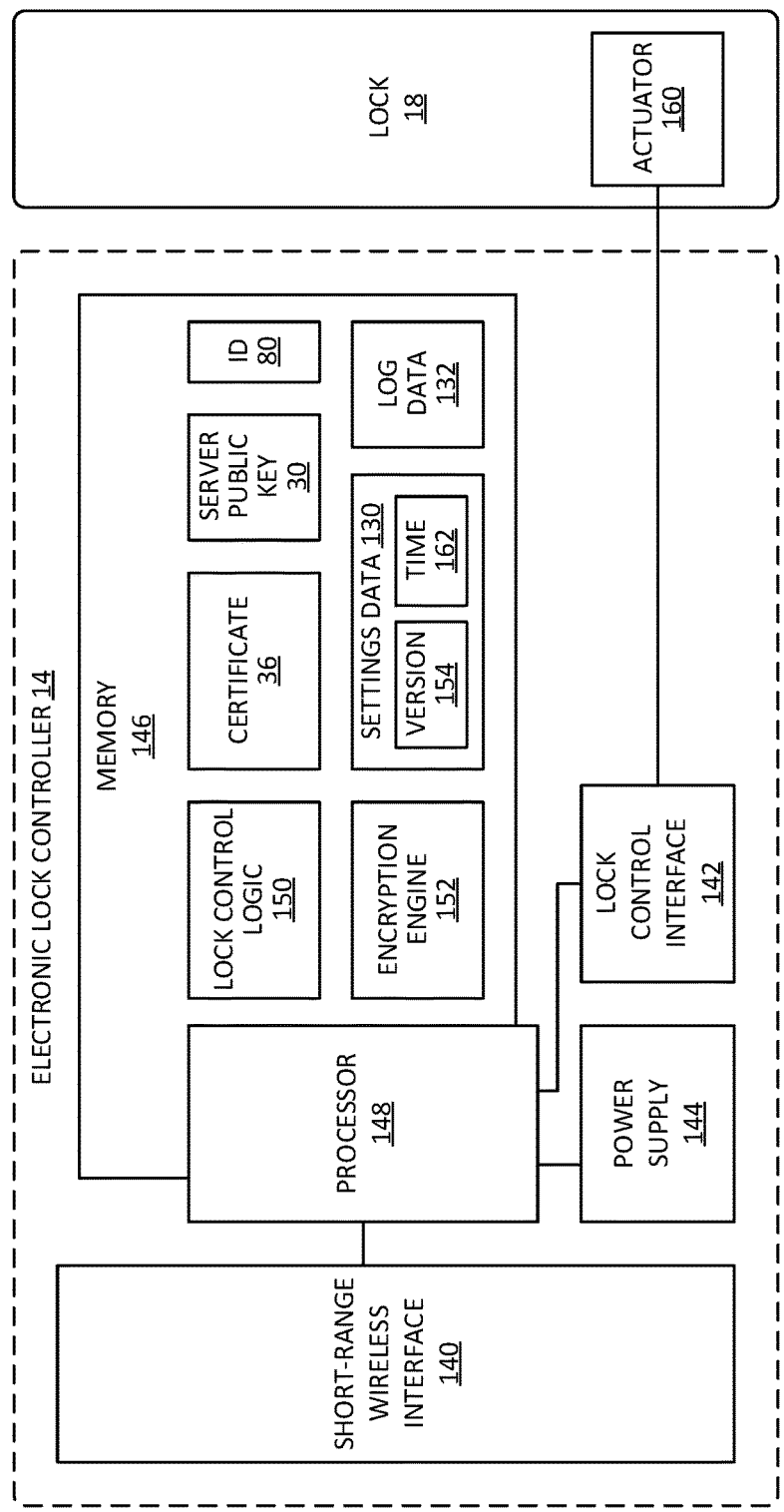
FIG. 5 is a diagram of an electronic lock controller.

FIG. 5 shows a block diagram of an electronic lock controller 14. The electronic lock controller 14 is one example of an electronic lock controller that can be used with the system 10.

The electronic lock controller 14 includes a short-range wireless interface 140, a lock control interface 142, a power supply 144, memory 146, and a processor 148. The short-range wireless interface 140 includes a short-range communications interface, such those discussed above (e.g., Bluetooth, BLE, etc.), configured for communication with wireless mobile devices 16 in vicinity of the electronic lock controller 14. The memory 146 includes any combination of ROM, RAM, flash memory, magnetic storage, optical storage, and similar for storing instructions and data as discussed herein. The processor 148 includes one or more CPUs, microcontrollers, microprocessors, processing cores, field-programmable gate arrays FPGAs, and similar. All or some of the memory 146 may be integrated with the processor 148. The processor 148 and memory 146 cooperate to execute instructions to cause the electronic lock controller 14 to perform the functionality discussed herein. In this embodiment, the electronic lock controller 14 notably excludes any long-range wired/wireless communications interface.

The lock control interface 142 is configured to provide signals to the lock 18 and may also be configured to receive signals from the lock 18. The lock control interface 142 can include an I/O port/bus or similar. Examples of signals that can be sent to the lock 18 include an unlocking signal that unlocks the lock 18 and a locking signal that locks the lock 18. Examples of signals that can be received from the lock 18 include a status signal indicating whether the lock 18 is locked or unlocked. In this example, the lock 18 includes driving circuity and an electrical actuator 160 such as motor, solenoid, or similar that converts electrical power into mechanical movement of the lock 18 according to signals received from the lock control interface 142. In other examples, the lock control interface 142 includes one or both of such driving circuity and electrical actuator.

The power supply 144 is configured to provide power to the electronic lock controller 14. The power supply 144 may also be configured to provide power to the lock 18 if the lock does not have its own power supply. Examples of suitable power supplies 144 include batteries, wind generators, solar panels, a combination of such, and the like. Multiple power supplies 144 of the same or different types can be provided for redundancy.

The lock controller 14 is configured to store a digital certificate 36, the digital certificate 36 being digitally signed by the private key 32 of a server 12 previously. The digital certificate 36 includes public and private keys for the lock controller 14. The lock controller 14 is further configured to store the public key 30 of the server 12. The electronic lock controller 14 further stores its identifier 80, so that the lock controller 14 can consider only lock-access data containing the identical identifier 80 as valid.

The electronic lock controller 14 includes lock control logic 150 and an encryption engine 152. The control logic 150 is configured to transmit the public key of the digital certificate 36 to wireless mobile devices 16 through the wireless interface 140, so that the wireless mobile devices 16 may securely communicate with the lock controller 14. The control logic 150 is further configured to control the encryption engine 152 to decrypt encrypted lock-access data contained in messages received from wireless mobile devices 16 via the wireless interface 140. Decryption is performed using the private key of the digital certificate 36, so as to obtain decrypted lock-access data. The control logic 150 is further configured to validate the authenticity of any received lock-access data using the public key 30 of the server 12. The lock control logic 150 is also configured to check authenticated lock-access data against internal settings data 130 and to the control the lock control interface 142 to unlock the physical lock 18, as permitted by lock-access data, so as to grant access to the physical resource 20.

Settings data 130 stores settings of the electronic lock controller 14, including at least the internal time 162 of the lock controller 14. The lock control logic 150 references the internal time 162 when determining whether to actuate the lock 18 based on received lock-access data. Settings data can also include version data 154 for comparison with version data received in lock-access data from a wireless mobile device 16 requesting access to the physical resource. The lock control logic 150 is configured to compare received version data with stored version data 154 as a condition to grant access to the physical resource. Version data is thus a check as to whether the user of the wireless mobile device 16 is still permitted to access the resource after a version update has been made to deny one or more other users access to the resource.

The lock control logic 150 is further configured to record instances of access to the physical resource as log data 132. Further, the lock control logic 150 can be configured to use the encryption engine 152 to encrypt the log data 132 using the public key 30 of the server 12. The lock control logic 150 transmits messages containing log data, whether encrypted or not, to any wireless mobile devices 16 in vicinity of the wireless interface 140 for transport back to the server 12.

The lock control logic 150 can be configured to broadcast a status of any data stored at the electronic lock controller 14, including settings data 130 and log data 132. Status for settings data can include an indication of the last time that the lock controller's internal time 162 was adjusted or an indication that a time check and potential adjustment is required. It is contemplated that a lock controller's internal time may be incorrect due to a variety of reasons, such as clock drift, power loss events, daylight savings mismatches, and similar. Maintaining an accurate internal time advantageously allows for more thorough control of access to the resource, in that expired or early lock-access data cannot be used to gain access.

A status notification for version data 154 can include an indication of the last time that the version data 154 was updated or an indication of the version data itself.

A status notification for log data 132 can include an indication of new log data requiring transport to the server 12 and may further include an indication of a number/quantity of such log data.

Multiple of the above status notification examples can be combined into a single status notification that is broadcasted. The specific form of any broadcasted status notifications can be varied and is not particularly limited. Status notifications may be broadcasted in plaintext or as encrypted by, for instance, the public key 30 of the server 12. It is advantageous that the broadcasting of status notifications allows the lock controllers 14 to not be always connected to the network 24. This makes large deployments more practical where, rather than connecting each lock controller 14 to the internet, a plurality of wireless mobile devices 16 are used to relay data between the server 12 and the lock controllers 14. Instead of one user or a small group of users moving from lock to lock to maintain the lock controllers, the users themselves maintain the lock controllers without any intentional action needed.

The lock control logic 150 can be configured to receive messages containing encrypted settings data 130 from wireless mobile devices 16 via the wireless interface 140. The lock control logic 150 then uses the encryption engine 152 to decrypt the encrypted settings data using the private key of the certificate 36 and validates authenticity of the settings data using the public key 30 of the server 12. If the settings data 130 can be authenticated, then the lock control logic 150 updates the respective setting or settings of the lock controller 14.

FIGS. 6-9 show processes according to the present invention. These processes may be used with the system 10 or with another system. The processes will be discussed in the context of the system 10 for sake of explanation.

Figure 6:
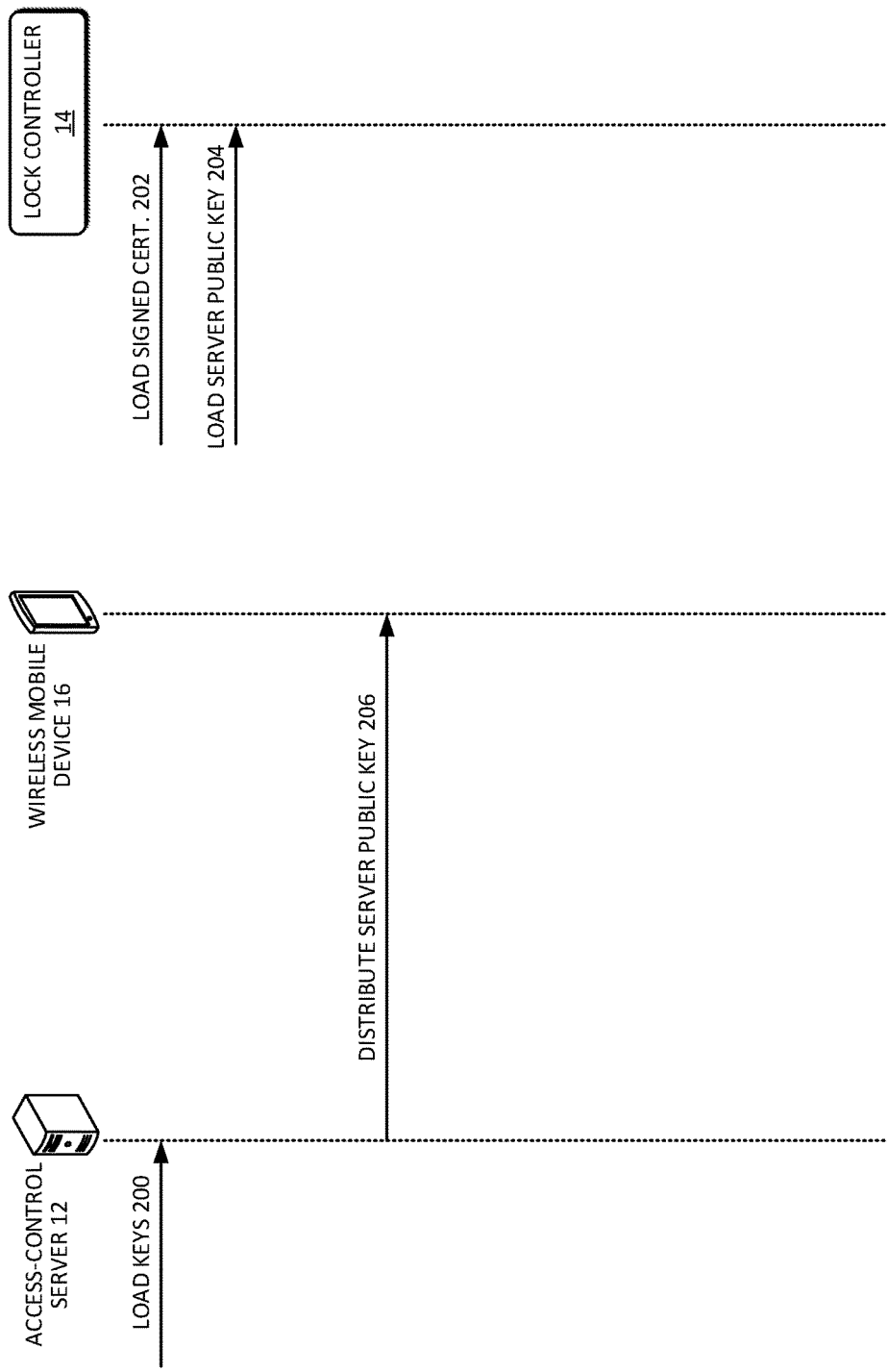
FIG. 6 is a diagram of a setup process.

FIG. 6 shows process for setting up the server 12, wireless mobile devices 16, and electronic lock controllers 14.

At step 200, a public and private key pair for the server is loaded onto the server 12 in a secure manner.

At step 202, a digital certificate in loaded onto each electronic lock controller 14. Each electronic lock controller 14 has its own unique digital certificate and each digital certificate has been digitally signed by the private key of the server 12. Each digital certificate has a different public and private key pair for the respective the electronic lock controller 14. Signing and certificate loading is preferably done in a secure environment, such as at a manufacturing facility or lock deployment facility.

At step 204, the public key of the server 12 is loaded onto each electronic lock controller 14. This can be done with step 202 or at another time, and is preferably done in a secure environment, such as at a manufacturing facility or lock deployment facility.

At step 206, the server's public key is distributed to each wireless mobile device 16. This can be done at any time and can be done periodically, as new devices are deployed and existing ones updated. For example, the server's public key can be transmitted to a wireless mobile device 16 after the user at the wireless mobile device 16 logs into his/her user account with the server 12.

The result of the setup process of FIG. 6 is that the server 12 digitally signs messages for each lock controller 14, passes these messages to respective wireless mobile devices 16, and that such devices 16, 14 can validate the authenticity of such data using the server's public key. Moreover, secure communications can be established between a wireless mobile device 16 and an electronic lock controller 14 using the signed digital certificate provided to the electronic lock controller 14.

Figure 7:
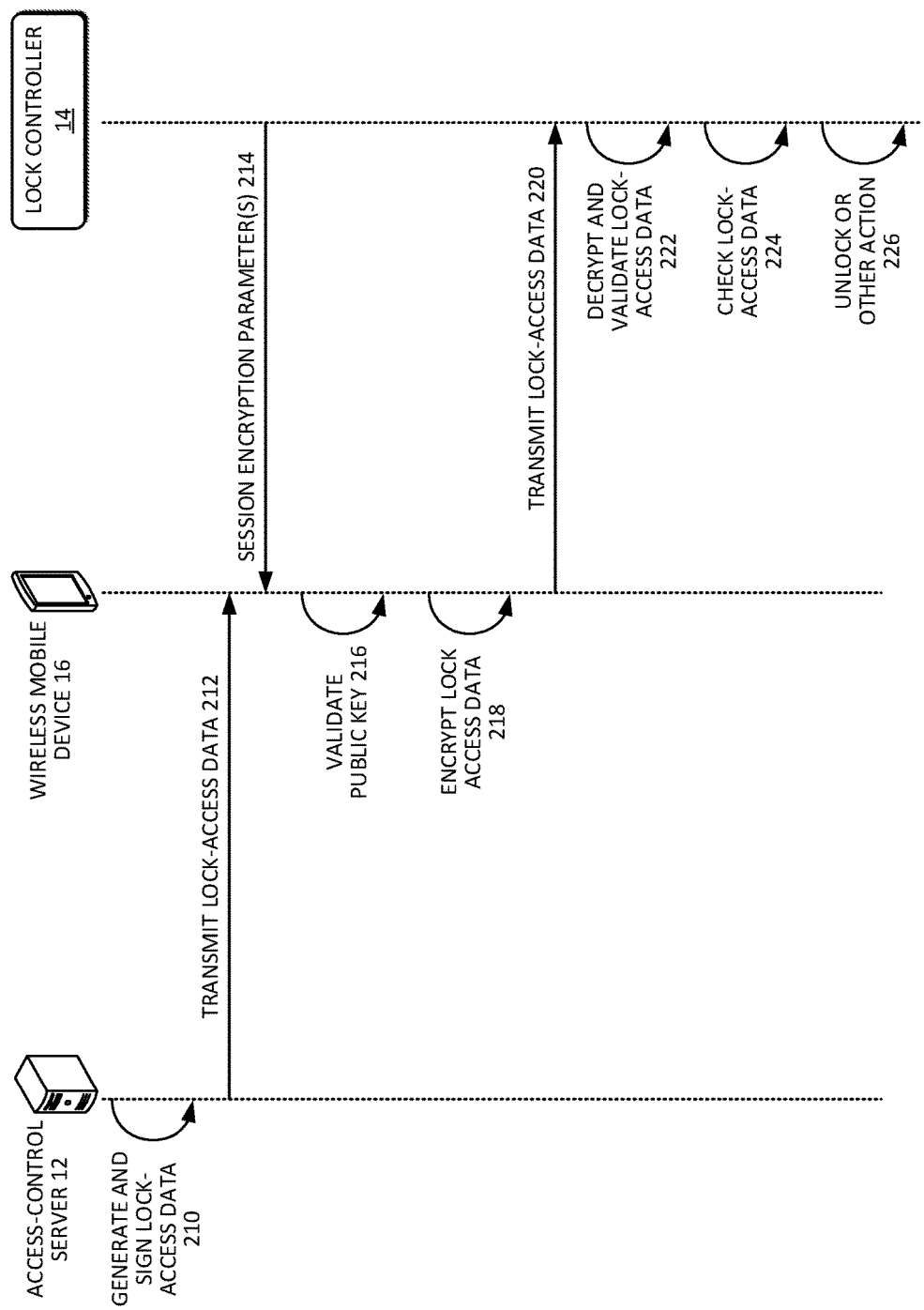
FIG. 7 is a diagram of an unlocking process.

FIG. 7 shows a process for securely controlling an electronic lock controller 14 to unlock its lock or to perform another action, after the setup process of FIG. 6 has been completed.

At step 210, the server 12 generates lock-access data for access to a specific physical resource guarded by a specific lock controller 14 by a specific user in possession of a wireless mobile device 16. Generation of lock-access data can be on demand as triggered, for example, by the user logging into his/her account with the server 12. Generation of lock-access data can alternatively or additionally be periodic, as controlled by a regeneration period and, optionally, a longer regeneration end time. The server 12 digitally signs all lock-access data with its private key.

At step 212, the server 12 transmits the signed lock-access data to the wireless mobile device 16 over a secure communications channel (e.g., TLS).

At some time in the future, the wireless mobile device 16 moves into the vicinity of the electronic lock controller 14. The user then expresses an intention through the mobile wireless device 16 to access the physical resource protected by the lock controller 14. This can be done via an application at the mobile wireless device 16, such as the application discussed above. In response, the mobile wireless device 16 and lock controller 14 establish communications though a short-range wireless interface and session encryption parameters are shared, at step 214. Session encryption parameters include one or more randomized session variables. If the mobile wireless device 16 does not yet have the lock controller's certificate (e.g., this is the first instance of communication between the two devices), the mobile wireless device 16 requests it and the electronic lock controller 14 transmits its certificate to the wireless mobile device 16, at step 214. The mobile wireless device 16 can save certificates for the future use.

Next, at step 216, the wireless mobile device 16 uses the public key of the server 12 to validate the authenticity of the public key received from the electronic lock controller 14, as the certificates and therefore public keys distributed to legitimate electronic lock controllers 14 were digitally signed by the server's private key. This verifies that the lock controller 14 is not an impostor that has been set up, for instance, to steal valid, signed lock-access data from the system.

At step 218, the wireless mobile device 16 encrypts the lock-access data using the public key of the electronic lock controller 14. A random or pseudorandom session identifier may also be used when encrypting the lock-access data. A hardware-based random number generator can be used to generate session identifiers.

Then, at step 220, after validating the authenticity of the public key received from the lock controller 14, the wireless mobile device 16 transmits the encrypted lock-access data within a message to the electronic lock controller 14. It is noteworthy that this transmission does not rely on other or additional wireless encryption, such as that afforded by Bluetooth pairing, Wi-Fi WPA2, etc.

The electronic lock controller 14 receives the message containing the encrypted lock-access data, at step 222, and decrypts the encrypted lock-access data using its private key (and the session identifier, if used). The lock controller 14 then validates the authenticity of the decrypted lock-access data using the public key of the server 12, as legitimate lock-access data previously digitally signed by the server using its private key.

Next, at step 224, the lock controller 14 checks the decrypted lock-access data against its internal data, such as its identity, schedule data, and version data. One condition for unlocking the lock operated by the lock controller 14 is the lock controller 14 confirming that a lock-controller identifier 80 contained in the lock-access data matches the lock-controller identifier 80 stored in the lock controller 14. That is, the lock controller 14 only responds to lock-access data that correctly identifies the lock controller 14.

Internal time maintained by the lock controller 14 can be compared to start and end times for permitted access contained in lock-access data. For instance, the lock is only unlocked when the lock controller's internal time is between start and end times of the schedule data. Version data is an arbitrary number, code, token, or similar, as discussed above, that represents the lock-access data as being the most recent available from the perspective of the lock controller 14. For instance, the lock is only unlocked when the version data provided in the lock-access data matches the lock controller's own version data.

At step 226, the electronic lock controller 14 unlocks the physical lock, if permitted by the check performed to the lock-access data, at step 224. If the condition or conditions evaluated in step 224 result in a denial of access, other action can be taken at step 226, as discussed elsewhere herein. Moreover, it is contemplated that unlocking in merely one action that can be performed on the lock. Hence, step 226 can perform alterative or additional actions to unlocking, such as locking. Step 226 can also include logging the access or other action taken by recording, for example, the user identifier, time, and type of access or attempted access.

As can be understood from the process of FIG. 7, the lock controller 14 only responds to commands provided by a wireless mobile device 16 when such commands can be validated as being permitted by the server 12. This allows central control of physical access to distributed physical resources. If a specific user is to be denied access, then this can be effected at the server 12 by withholding lock-access data containing current access start/end times and/or withholding lock-access data containing current version data. This can be done on the basis of individual lock controllers 14, so that access can be granted and revoked, as needed.

In some embodiments, lock-access data can be set to have a very short time window of validity, necessitating a user to authenticate with the server very near to the time (and place) of access to the physical resource. This may improve security in some situations where network connectivity is available near the physical resource. In any event, the validity time of lock-access data can be selected to ensure security while at the same time allowing users enough time to physically reach the resource and unlock it.

Figure 8:
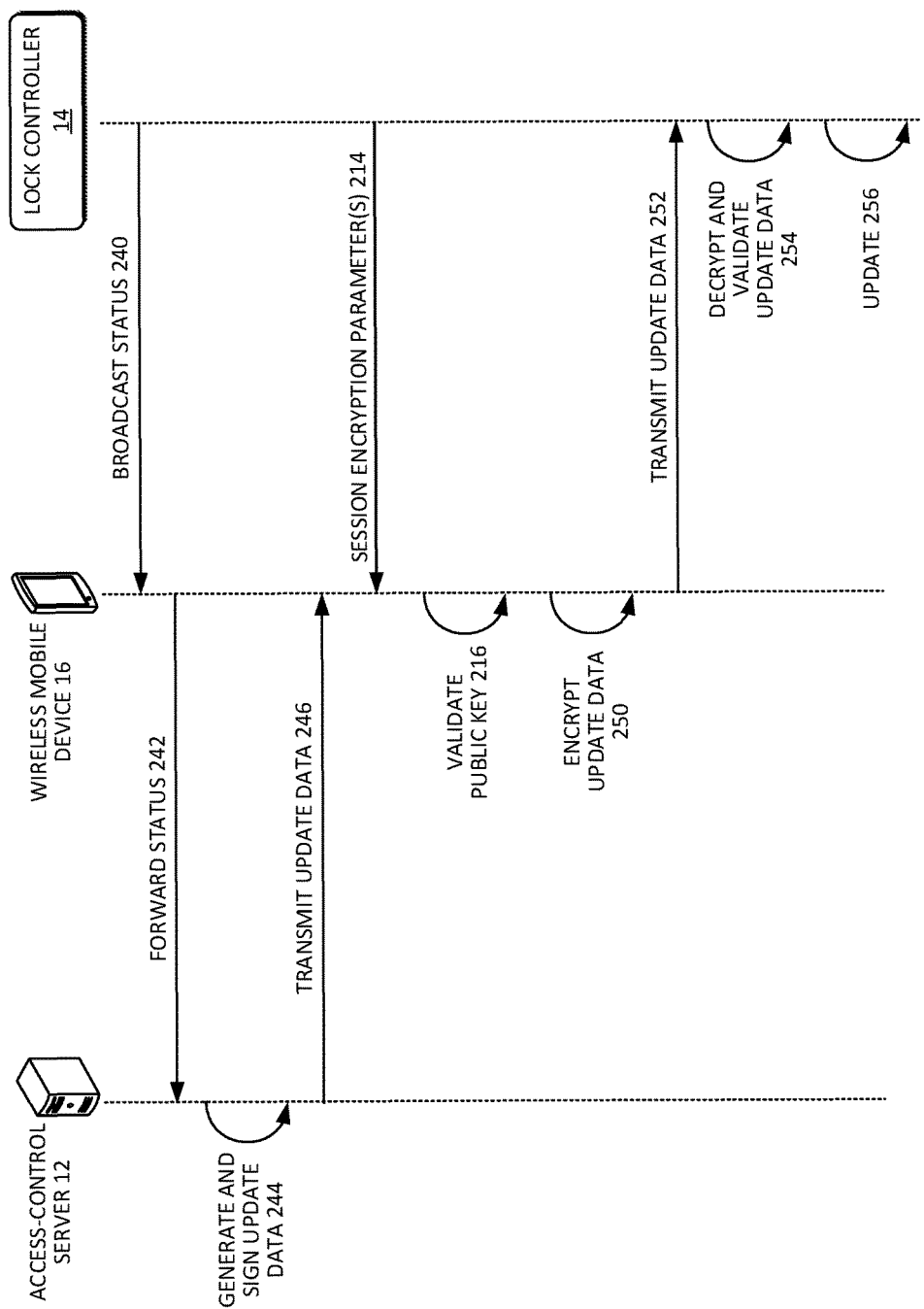
FIG. 8 is a diagram of an updating process.

FIG. 8 shows a process for securely updating data of the lock controllers 14. This process can be used to update any combination of version data, schedule data, other setting data at the lock controllers 14.

At step 240, a lock controller 14 broadcasts a notification of a status of its data. A status can be an indication that data at the lock controller 14 requires updating. Alternatively, the status can simply be an indication of the age of the data at the lock controller 14. The broadcasted status can be obfuscated or encrypted.

At step 242, a wireless mobile device in the vicinity of the lock controller 14 receives the broadcast and forwards the status to the server 12.

The server 12 then checks the status and generates update data if needed, at step 244. For example, the status indicates the internal time of the lock controller 14 and the server 12 compares the internal time to its own time and generates a new internal time or time correction to send to the lock controller 14 if the lock controller's time is not accurate enough. In another example, the status represents the version data at the lock controller 14 and the server 12 determines whether the version data requires an update. The server 12 signs update data with its private key.

Update data is then transmitted to the wireless mobile device 16, at step 246.

If this is the first interaction between the wireless mobile device 16 and the lock controller 14, the wireless mobile device 16 receives and validates the authenticity of the lock controller's certificate, in steps 214 and 216, as discussed above. Step 214, also includes sharing one or more session encryption parameters.

The wireless mobile device 16 uses the lock controller's public key to encrypt the update data, at step 250, before transmitting a message contained the encrypted update data to the lock controller 14, at step 252.

The lock controller 14 receives the message containing the encrypted update data, decrypts the update data, and uses the server's public key to validate the authenticity of the update data, at step 254.

If the update data is successfully validated, then the lock controller 14 implements the update represented by the update data, at step 256. The lock controller 14 thus updates its internal time, version number, or other setting so that access permissions are made current.

The update process of FIG. 8, or at least steps 244-256 of the process, can be performed before the access granting process of FIG. 7 for a communicating wireless mobile device 16 and lock controller 14, so that access permissions are made current before any access request by the wireless mobile device 16 is processed. This is useful because, for example, it may be the case that the wireless mobile device 16 facilitating the update to the lock controller 14 is to be denied access by the same update.

Figure 9:
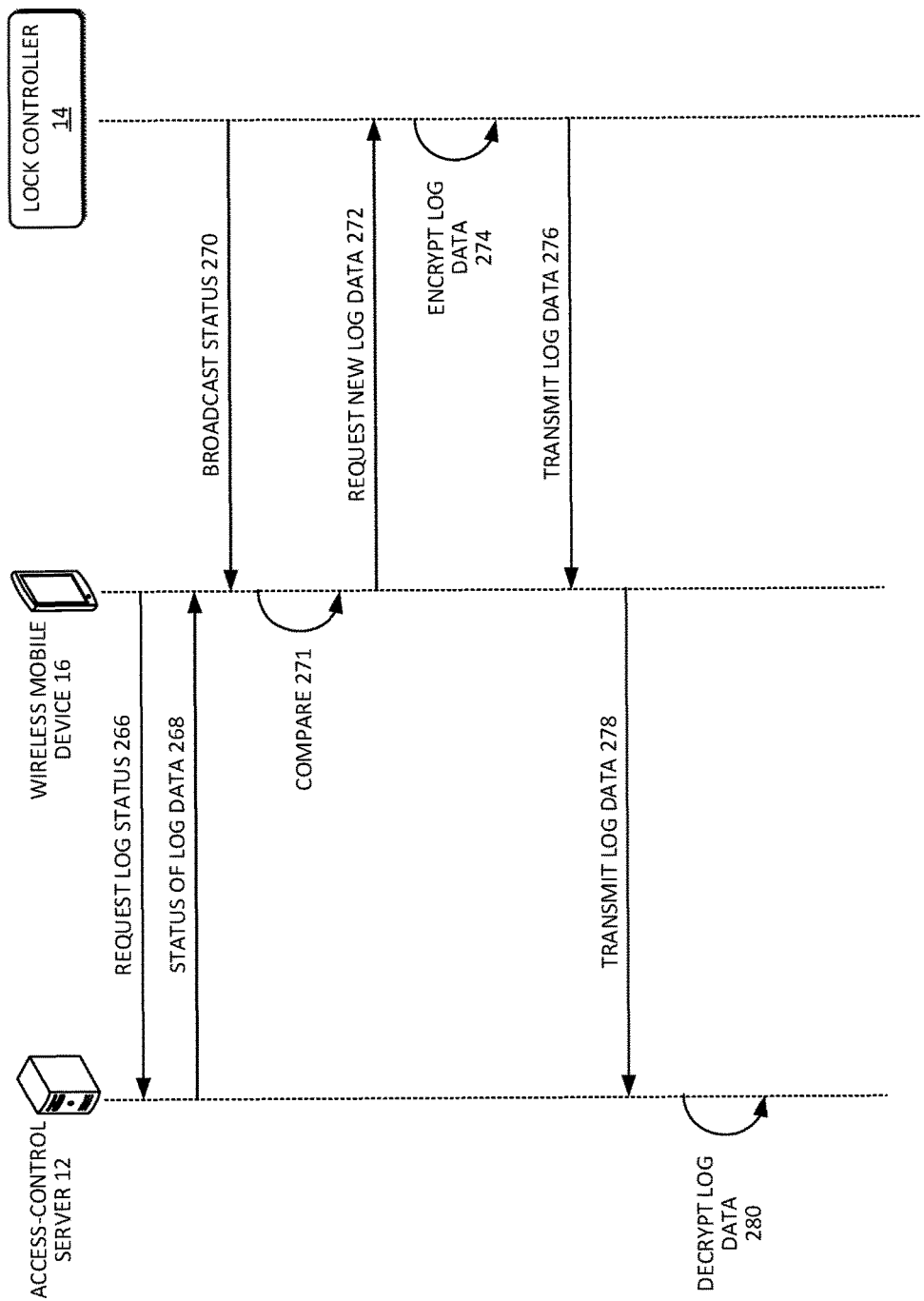
FIG. 9 is a diagram of a log capturing process.

FIG. 9 shows a process for securely collecting log data from the lock controllers 14. The log data is indicative of past access to the physical resource via the electronic lock controller 14 and/or other actions taken by the user and lock controller 14.

At step 266, the wireless mobile device 16 requests from the server 12 a status of captured log data for the lock controller 14 with which the wireless mobile device 16 is communicating. In response, at step 268, the server 12 transmits to the wireless mobile device 16 a status indication of log data present on the server 12 for this lock controller 14. Log data status can include a number of log items stored at the server 12, for example.

At step 270, the lock controller 14 broadcasts a status notification for its log data. The status can be an indication of a quantity of log data at the lock controller 14. The broadcasted status can be obfuscated or encrypted. Step 270 can occur before or after steps 266 and 268.

At step 271, the wireless mobile device 16 receives the broadcast and compares the log-data indication received from the server 12 with that received from the lock controller 14 to determine if the server 12 lacks any log data. For example, the wireless mobile device 16 may determine that the lock controller 14 has indicated that it has more log items than the server 12 has, and hence that the additional new log data should be obtained from the lock controller 14 and sent to the server 12. The number of log items is used for the comparison, in this example. In other examples, an amount of log data (e.g., kB, MB, etc.) or a most recent log item timestamp can be used.

If there is new log data to obtain, at step 272, the wireless mobile device 16 sends a request for at least the new log data to the lock controller 14.

At step 274, the lock controller 14 encrypts the log data using the public key of the server 12 before transmitting a message containing the encrypted log data to the wireless mobile device 16, at step 276.

Then, at step 278, the wireless mobile device 16 transmits the encrypted log data to the server 12, which receives the encrypted log data and can then decrypt the log data using its private key, at step 280, store the log data, process it, and/or present the log data. In the case of poor mobile network coverage, step 278 may occur after the mobile wireless device 16 returns to coverage.

Further additional or alternative aspects of the present invention are described in the following.

Each time a user logs into the his/her account at the server 12, the server 12 may force the user's wireless mobile device 16 to delete all stored lock-access data and download fresh lock-access data from the server 12.

The application 134 at the wireless mobile device 16 can be configured to routinely delete expired lock-access data 62.

The lock control logic 150 of a lock controller 14 can be configured to require two or more elements of validated lock-access data 62 in order to provide access to the physical resource to two or more different users at the same time. This adds an additional layer of security, in that two or more different users must be present at the lock controller 14 to gain access to the resource, reducing the risk of theft or other undesirable occurrence.

Figure 10:
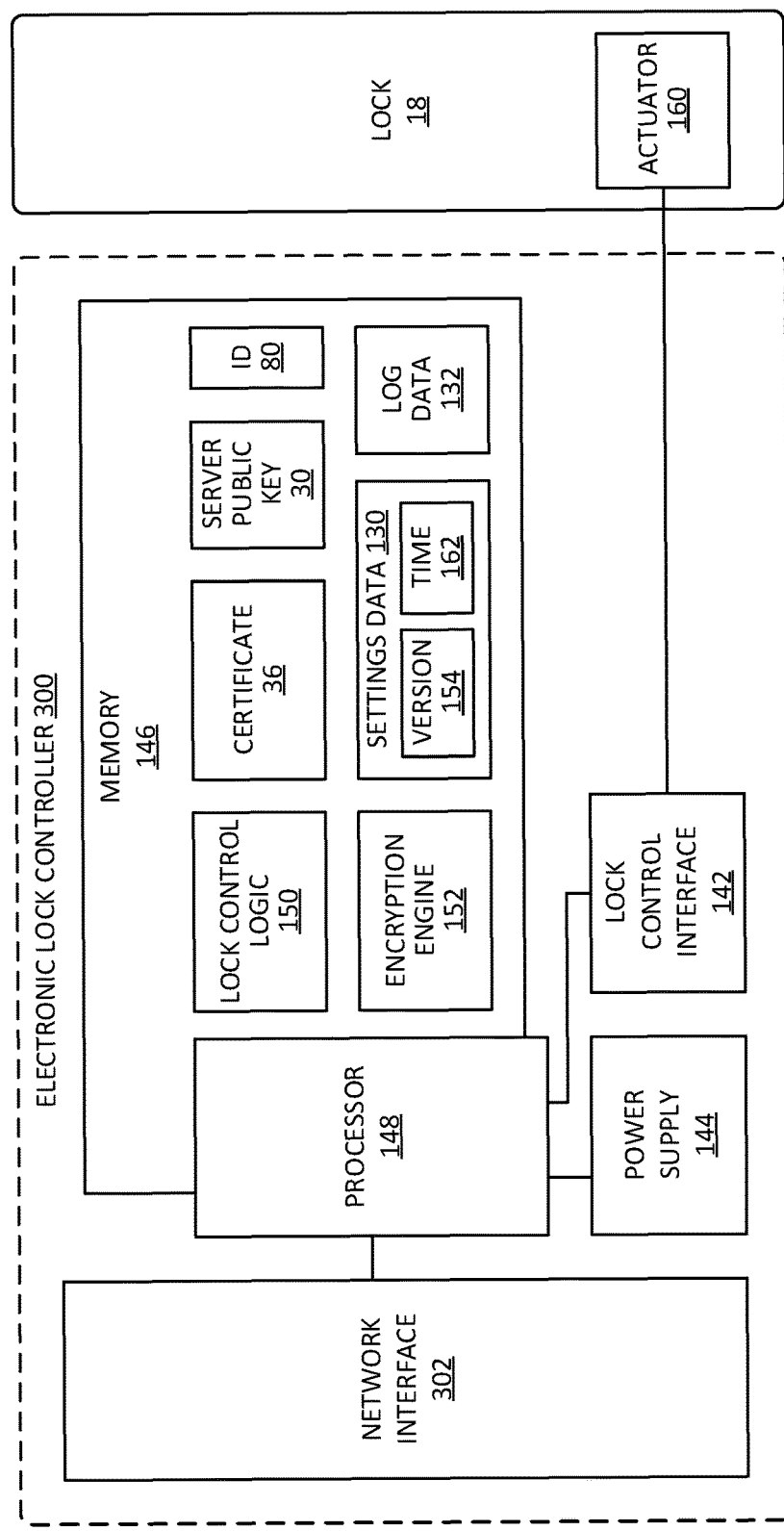
FIG. 10 is a diagram of another electronic lock controller.

FIG. 10 shows another embodiment of an electronic lock controller 300. This embodiment is similar to the embodiment of FIG. 5 and only differences will be discussed in detail. The lock controller 300 includes a network interface 302 configured for bidirectional data communications via the computer network 24. The network interface 302 includes a network adaptor and driver suitable for the type of network 24. This allows the electronic lock controller 300 to communicate with wireless mobile devices 16 through the internet or other component of the network 24. As such, access can be granted to a physical resource outside of the proximity of the respective lock controller 300. For instance, a user with a wireless mobile device 16 can open a lock from a location remote to the lock, so as to grant physical access to another user who is physically located at the lock.

In view of the above, numerous advantages of the present invention should be apparent. Access to physical resources, which may be remote or infrequently accessed, can be readily centrally controlled while maintaining a fully set of access permissions only at the server. Further, the lock controllers need not be aware of the full set of access permissions for all users, and simply need to respond to received digitally signed lock-access data. The lock controllers do not even require their own data connectivity and instead can use any nearby wireless mobile device as a conduit to the server. In addition, revoking access to one or more users is readily achievable without having to distribute new keys.

Reliance on network-specific encryption and authentication mechanisms is avoided, as many, such as WPA and Bluetooth 4.0, have been shown to be vulnerable. In contrast, the present invention is transport-agnostic by virtue of the use of digital certificates. The present invention can operate without dependence on Bluetooth or WLAN security, and hence can be readily ported to multiple (and future) wireless technologies, while avoiding the pitfalls of current wireless security protocols.

The use of digital certificates and the broadcasting of status notifications enables multiple devices to control/update any lock controller, with the users of such devices being aware of the update/control. Dependence on special manager/admin devices is reduced or eliminated. Further, the broadcasting of status notifications avoids each mobile device connecting to a lock controller having to check for log data or update requirements. Polling is avoided. Instead, mobile devices within range are notified of lock-controller state changes and respond appropriately.

Moreover, the use of digital certificates and version data enables effective scaling to many users (e.g., thousands or more users in enterprise deployment of resources), as each lock controller need not know each user's permissions. Rather, each lock controller need only respond to valid lock-access data. Further, a lock controller can be configured to respond only to multiple elements of lock-access data provided by different devices for even greater security.

In addition, the present invention provides for real-time unlocking decisions based on a mobile device's connectivity with a server, and not on a lock-controller's ability to connect to the server. While the foregoing provides certain non-limiting examples, it should be understood that combinations, subsets, and variations of the foregoing are contemplated. The monopoly sought is defined by the claims.

What is claimed is:

1. A process for providing secure access to a physical resource, the process comprising:
   loading a digital certificate onto an electronic lock controller, the digital certificate being digitally signed by a private key of a server, the digital certificate having a public key of the electronic lock controller and a corresponding private key of the electronic lock controller, the electronic lock controller operably connectable to a physical lock that restricts access to the physical resource;
   loading onto the electronic lock controller a public key of the server that corresponds to the private key of the server;
   distributing the public key of the server to a wireless mobile device;
   the server signing lock-access data with the private key of the server, the lock-access data defining physical access permission to the physical resource by a user of the wireless mobile device;
   transmitting the lock-access data to the wireless mobile device via a computer network;
   the wireless mobile device encrypting the lock-access data using the public key of the electronic lock controller and providing the encrypted lock-access data in a message for the electronic lock controller;
   when the wireless mobile device is in vicinity of the electronic lock controller, the wireless mobile device transmitting the message containing the encrypted lock-access data to the electronic lock controller;
   the electronic lock controller receiving the message, decrypting the encrypted lock-access data using the private key of the electronic lock controller to obtain the lock-access data, and validating authenticity of the lock-access data using the public key of the server;
   after validating the authenticity of the lock-access data, the electronic lock controller unlocking the physical lock if permitted by the lock-access data to grant the user access to the physical resource.

2. The process of claim 1, further comprising:
   when the wireless mobile device is in vicinity of the electronic lock controller, the electronic lock controller transmitting the public key of the electronic lock controller to the wireless mobile device; and
   after receiving the public key of the electronic lock controller, the wireless mobile device using the public key of the server to validate authenticity of the public key of the electronic lock controller.

3. The process of claim 1, further comprising the electronic lock controller encrypting log data indicative of past physical access to the physical resource using the public key of the server and transmitting a message containing the encrypted log data to the wireless mobile device for communication over the computer network from the wireless mobile device to the server.

4. The process of claim 1, further comprising the wireless mobile device encrypting settings data using the public key of the electronic lock controller and providing the encrypted settings in a message for the electronic lock controller, and the electronic lock controller receiving the message, decrypting the encrypted settings data using the private key of the electronic lock controller to obtain the settings, validating authenticity of the settings data using the public key of the server, and updating at least one setting of the electronic lock controller based on the settings data.

5. The process of claim 4, wherein the settings data includes version data for storage at the electronic lock controller, the process further comprising including version data in the lock-access data, the electronic lock controller matching version data stored at the electronic lock controller with version data received in the lock-access data as a condition for permitting access to the physical resource.

6. The process of claim 5, wherein the lock-access data includes a unique identifier of the electronic lock controller, a start time defining a beginning of a period of permitted access, an end time defining an end of the period of permitted access, and the version data.

7. The process of claim 4, further comprising the server digitally signing the settings data using the private key of the server before transmitting the settings data to the wireless mobile device.

8. The process of claim 1, wherein the lock-access data includes a unique identifier of the electronic lock controller, a start time defining a beginning of a period of permitted access, an end time defining an end of the period of permitted access, the process further comprising periodically regenerating the lock-access data with updated start and end times to allow for continued access to the physical resource.

9. The process of claim 8, further comprising ceasing to regenerate the lock-access data to deny access to the physical resource.

10. The process of claim 1, further comprising the electronic lock controller broadcasting to any wireless mobile device in vicinity a notification of a status of data of the electronic lock controller requiring transport or update.

11. The process of claim 1, further comprising:
loading a unique digital certificate onto each of a plurality of electronic lock controllers including the electronic lock controller, each digital certificate being digitally signed by the private key of a server, each digital certificate having a public key of a respective electronic lock controller and a corresponding private key of the respective electronic lock controller, each electronic lock controller operably connectable to a respective physical lock that restricts access to a respective physical resource;
loading onto each electronic lock controller the public key of the server; and
distributing the public key of the server to a plurality of wireless mobile devices including the wireless mobile device.

12. A system for providing secure access to a physical resource, the system comprising:
a server including:
memory configured to store a public key of the server and a corresponding private key of the server;
a network interface configured for communication via a computer network;
a processor configured to digitally sign lock-access data with the private key of the server, the lock-access data defining physical access permissions to the physical resource for users of wireless mobile devices, the processor further configured to transmit the lock-access data to respective wireless mobile devices via the network interface;
an electronic lock controller operably connected to a physical lock that restricts access to the physical resource, the electronic lock controller including:
memory configured to store a digital certificate, the digital certificate being digitally signed by the private key of a server, the digital certificate having a public key of the electronic lock controller and a corresponding private key of the electronic lock controller, the memory further configured to store the public key of the server;
a wireless interface configured for communication with wireless mobile devices in vicinity of the electronic lock controller;
a processor configured to transmit the public key of the electronic lock controller to wireless mobile devices via the wireless interface, the processor further configured to decrypt encrypted lock-access data contained in messages received from wireless mobile devices via the wireless interface using the private key of the electronic lock controller to obtain lock-access data, the processor further configured to validate authenticity of lock-access data using the public key of the server;
the processor further configured to unlock the physical lock as permitted by authenticated lock-access data to grant respective users access to the physical resource;
a wireless mobile device including:
memory configured to store the public key of the server;
a wireless interface configured for communication with electronic lock controllers in vicinity of the wireless mobile device;
a network interface configured for communication with the server via the computer network;
a processor configured to use the public key of the server to validate authenticity of public keys of electronic lock controllers received from electronic lock controllers via the wireless interface, the processor further configured to encrypt lock-access data received from the server using public keys of the electronic lock controllers and transmit messages containing encrypted lock-access data to respective authenticated electronic lock controllers via the wireless interface.

13. The system of claim 12, further comprising a plurality of electronic lock controllers including the electronic lock controller for restricting access to respective physical resources, and further comprising a plurality of wireless mobile devices including the wireless mobile device.

* * * * *